United States Patent
Chen et al.

(10) Patent No.: US 11,902,055 B2
(45) Date of Patent: Feb. 13, 2024

(54) CLASSES OF NN PARAMETERS FOR CHANNEL ESTIMATION

(71) Applicant: NOKIA TECHNOLOGIES OY, Espoo (FI)

(72) Inventors: Yejian Chen, Stuttgart (DE); Stefan Wesemann, Kornwestheim (DE); Thorsten Wild, Stuttgart (DE); Jafar Mohammadi, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 21 days.

(21) Appl. No.: 17/908,726

(22) PCT Filed: Mar. 6, 2020

(86) PCT No.: PCT/EP2020/056066
§ 371 (c)(1),
(2) Date: Sep. 1, 2022

(87) PCT Pub. No.: WO2021/175444
PCT Pub. Date: Sep. 10, 2021

(65) Prior Publication Data
US 2023/0125699 A1    Apr. 27, 2023

(51) Int. Cl.
*H04L 25/02*    (2006.01)

(52) U.S. Cl.
CPC ...... *H04L 25/0254* (2013.01); *H04L 25/0224* (2013.01)

(58) Field of Classification Search
CPC ............. H04L 25/0254; H04L 25/0224; H04L 25/025
See application file for complete search history.

(56) References Cited

U.S. PATENT DOCUMENTS

2018/0367192 A1* 12/2018 O'Shea ................. G06N 3/044
2021/0351885 A1* 11/2021 Chavva ................ H04B 7/0626

OTHER PUBLICATIONS

International Search Report and Written Opinion dated Nov. 2, 2020 corresponding to International Patent Application No. PCT/EP2020/056066.

* cited by examiner

*Primary Examiner* — Sung S Ahn
(74) *Attorney, Agent, or Firm* — SQUIRE PATTON BOGGS (US) LLP

(57) ABSTRACT

It is provided a method, comprising identifying a value of an onsite channel characteristic of a receive channel; requesting a neural network parameter, wherein the request comprises an indication of the onsite channel characteristic; monitoring if the neural network parameter is received in response to the request; estimating the receive channel by a neural network using the neural network parameter if the neural network parameter is received.

20 Claims, 14 Drawing Sheets

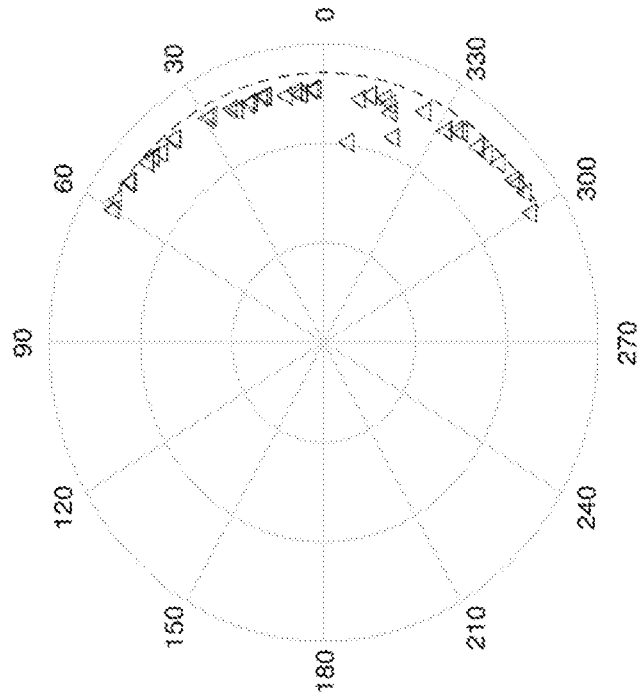
Fig. 9(b) Verification in spatial domain
△ Testing the universal model for dedicated DoA
- Benchmark of dedicated training model
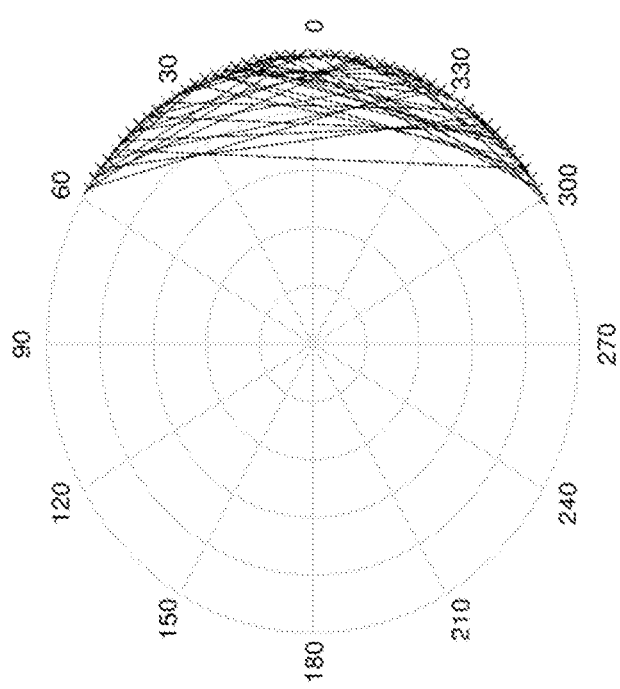
Fig. 9(a) Universal spatial training
× Spatial training data batches
- Order of the training

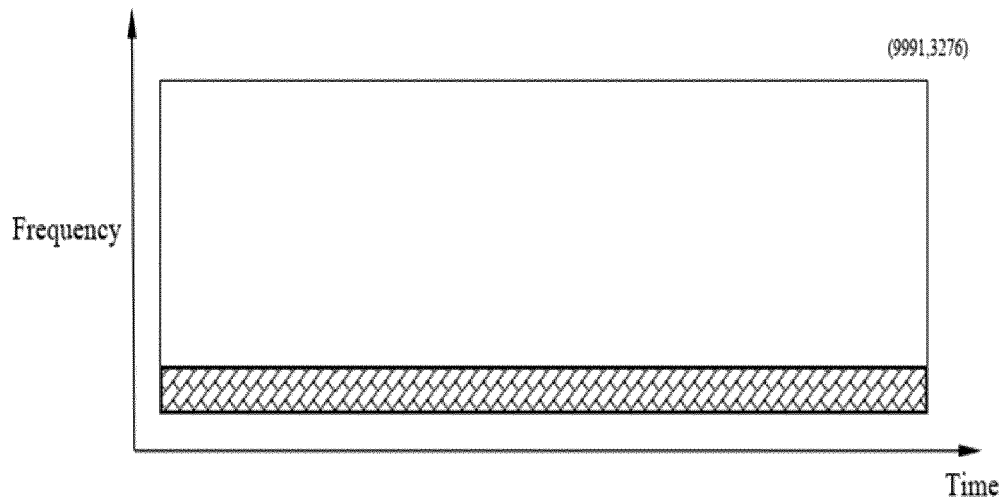
Experiment 1: 32 subcarriers over complete 9991 symbols in time domain
MSE: -21.3815 dB @ 10dB SNR
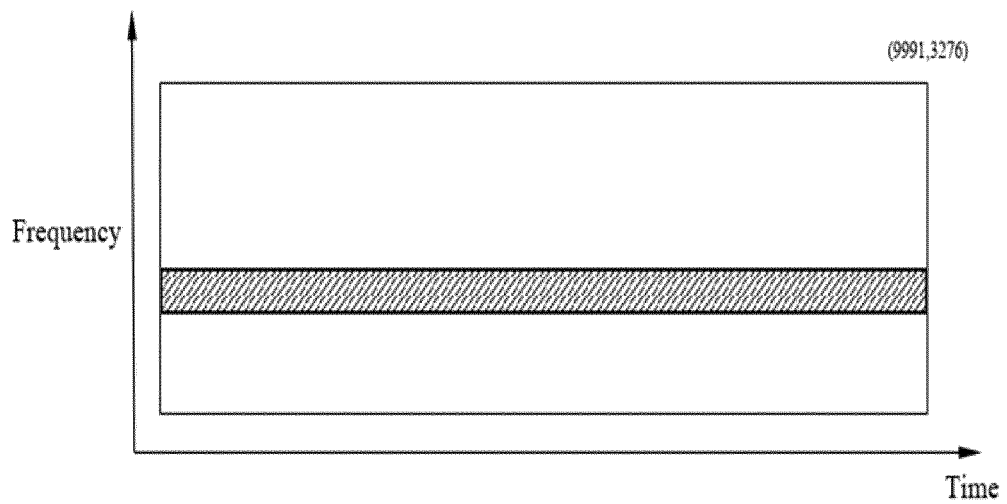
Experiment 6: 32 subcarriers over 9991 symbols in time domain (same training data amount as Experiment 1) with the model trained by Experiment 1 for another user!!!
MSE: -21.5602 dB @ 10dB SNR
Fig. 11

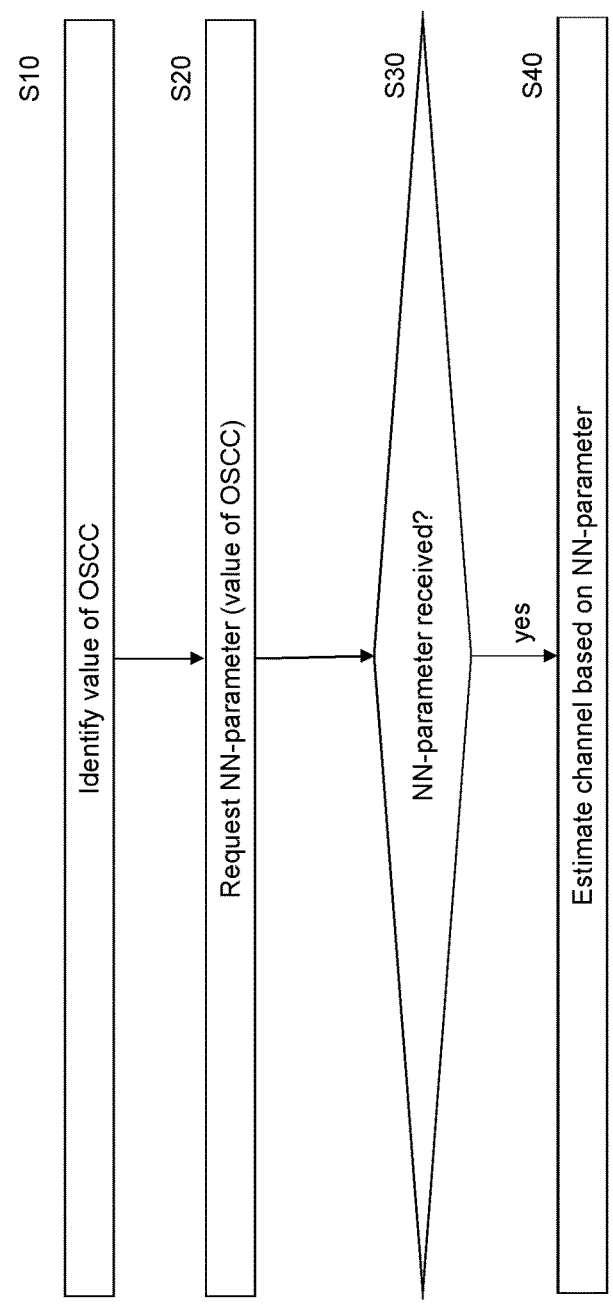
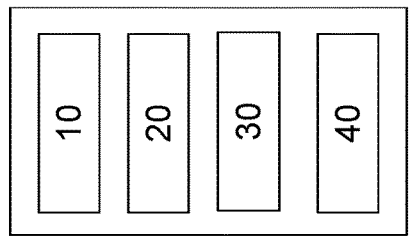

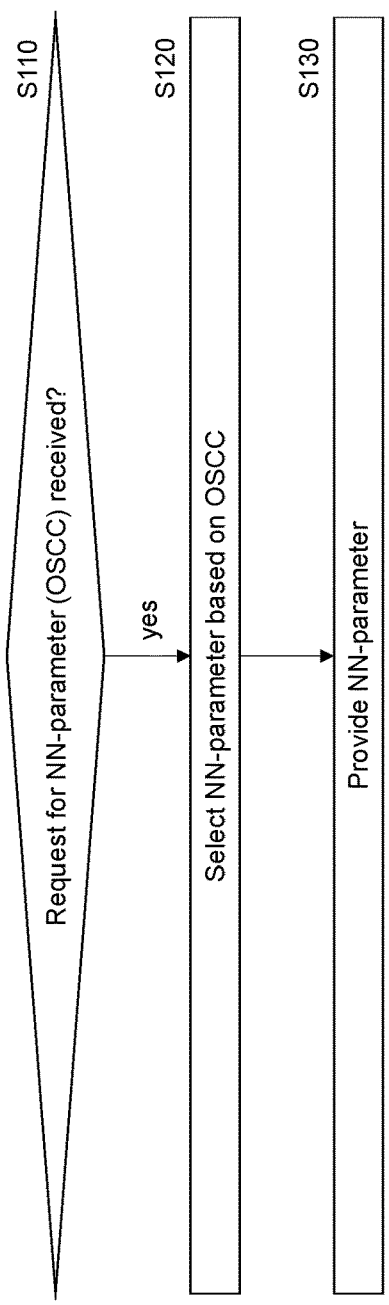
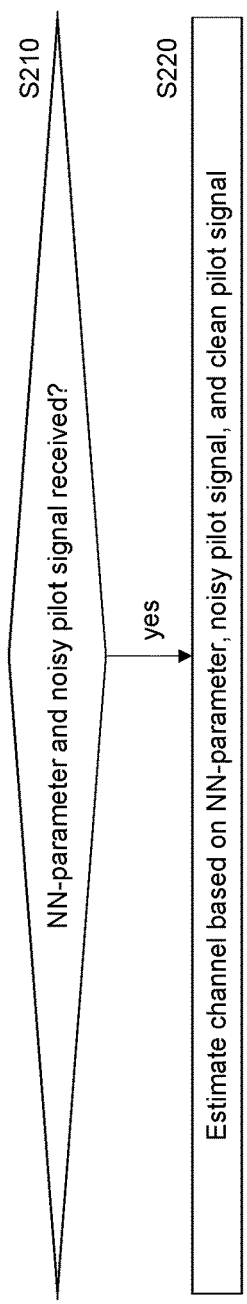
Fig. 15
Fig. 17
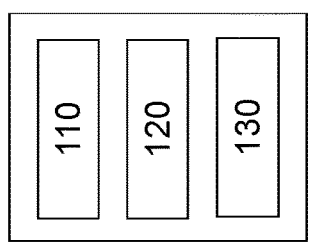
Fig. 14
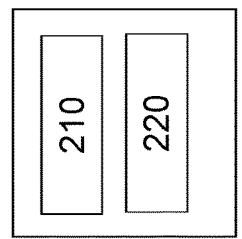
Fig. 16
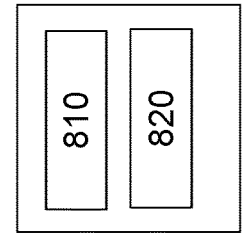
Fig. 18

US 11,902,055 B2

CLASSES OF NN PARAMETERS FOR CHANNEL ESTIMATION

FIELD OF THE INVENTION

The present invention relates to channel estimation. In particular, it relates to channel estimation using neural network methods.

Abbreviations
3GPP 3$^{rd}$ Generation Partnership Project
3G/4G/5G 3$^{rd}$/4$^{th}$/5$^{th}$ Generation
BLER Block Error Ratio
BS Base Station
CNN Convolutional Neural Network
CSI Channel State Information
DL Downlink
DoA Direction of Arrival
FDD Frequency Division Duplex
gNB next generation Node B
GPS Global Positioning System
LMMSE Linear Minimum Mean Square Error
LoS Line-of-Sight
MAC Medium Access Control
MCS Modulation and Coding Scheme
MIMO Multiple Input Multiple Output
ML Machine Learning
MMSE Minimum Mean Square Error
NLoS Non-Line-of-Sight
NMSE Normalized Mean Square Error
NN Neural Network
NOMA Non-Orthogonal Multiple Access
O&M Operation & Maintenance
OSCC On-Site Channel Characteristics
PHY PHYsical
ReLU Rectified Linear Unit
SINR Signal-to-Interference-Noise-Ratio
SISO Single-Input Single-Output
SNR Signal-to-Noise-Ratio
TDD Time Division Duplex
UE User Equipment
UL Uplink
ULA Uniform Linear Array
URA Uniform Rectangular Array
WiFi Wireless Fidelity

BACKGROUND OF THE INVENTION

In order to realize the challenges of 5th Generation (5G) wireless communication, both in PHYsical (PHY) and Medium Access Control (MAC) layers (e.g. advanced precoding for massive Multiple Input Multiple Output (MIMO), advanced receiver for Non-Orthogonal Multiple Access (NOMA), and advanced scheduling for resource allocation), accurate channel estimation as well as precise Channel State Information (CSI) feedback may be regarded as important technical prerequisites.

The conventional channel estimation for an antenna array system can be well modelled by an exact mathematical model, and thus can reach theoretical bound performance. Nevertheless, the computational requirement could be very high and might not be affordable by real-time processing.

In conventional channel estimation with an antenna array system, the per-survivor channel estimator [1] can enable joint data detection and channel estimation iteratively. Nevertheless, the complexity will increase exponentially, if the number of MIMO receive antennas and modulation order increase.

Linear Minimum Mean Square Error (LMMSE) channel estimator is a very good estimator, if the observations are Gaussian distributed random variables. Nevertheless, for the MIMO system with massive number of transmit and receive antennas, the estimation of spatial covariance matrix and the inversion of spatial covariance matrix can cause higher computational complexity.

REFERENCES

[1] Y. Chen; S. ten Brink; "Pilot Strategies for Trellis-Based MIMO Channel Tracking and Data Detection," in Proc. 2013 IEEE Global Telecommun. Conf. (Globecom '13), pp. 4313-4318, Atlanta, USA, December 2013.
[2] D. Neumann; T. Wiese; and W. Utschick; "Learning the MMSE channel estimator," IEEE Trans. Signal Process., vol. 66, no. 11, pp. 2905-2917, June 2018.
[3] S. Wesemann; T. Wild; J. Mohammadi; Y. Chen; "Online Training Method for ML-Based Channel Estimation," Patent Application PCT/EP2019/067806, Application Date: 3 Jul. 2019.
[4] C. Hellings; A. Dehmani; S. Wesemann; M. Koller; and W. Utschick; "Evaluation of Neural-Network-Based Channel Estimators Using Measurement Data," in Proc. ITG Workshop on Smart Antennas (WSA '19), April 2019.
[5] D. Neumann, M. Joham, L. Weiland, and W. Utschick, "Low-complexity computation of LMMSE channel estimates in massive MIMO," presented at the Int. ITG Workshop on Smart Antennas (WSA) 2015, Ilmenau, Germany, Mar. 3-5, 2015.

SUMMARY OF THE INVENTION

It is an object of the present invention to improve the prior art.

According to a first aspect of the invention, there is provided an apparatus, comprising at least one processor, and at least one memory including computer program code, wherein the at least one memory and the computer program code are configured, with the at least one processor, to cause the apparatus to:
  identify a value of an onsite channel characteristic of a receive channel;
  request a neural network parameter, wherein the request comprises an indication of the onsite channel characteristic;
  monitor if the neural network parameter is received in response to the request;
  estimate the receive channel by a neural network using the neural network parameter if the neural network parameter is received.

According to a second aspect of the invention, there is provided an apparatus, comprising at least one processor, and at least one memory including computer program code, wherein the at least one memory and the computer program code are configured, with the at least one processor, to cause the apparatus to:
  monitor if a request for a neural network parameter is received, wherein the request comprises an indication of an onsite channel characteristic;
  select the neural network parameter based on the onsite channel characteristic if the request is received;
  provide the neural network parameter in response to the request.

According to a third aspect of the invention, there is provided an apparatus, comprising at least one processor, and at least one memory including computer program code, wherein the at least one memory and the computer program code are configured, with the at least one processor, to cause the apparatus to:

monitor if a neural network parameter and a noisy pilot signal are received on a receive channel;

estimate the receive channel from the receiver by a neural network using the neural network parameter, the noisy pilot signal, and a clean pilot signal if the neural network parameter and the noisy pilot signal are received.

According to a fourth aspect of the invention, there is provided a method, comprising identifying a value of an onsite channel characteristic of a receive channel;

requesting a neural network parameter, wherein the request comprises an indication of the onsite channel characteristic;

monitoring if the neural network parameter is received in response to the request;

estimating the receive channel by a neural network using the neural network parameter if the neural network parameter is received.

According to a fifth aspect of the invention, there is provided a method, comprising monitoring if a request for a neural network parameter is received, wherein the request comprises an indication of an onsite channel characteristic;

selecting the neural network parameter based on the onsite channel characteristic if the request is received;

providing the neural network parameter in response to the request.

According to a sixth aspect of the invention, there is provided a method, comprising monitoring if a neural network parameter and a noisy pilot signal are received on a receive channel;

estimating the receive channel from the receiver by a neural network using the neural network parameter, the noisy pilot signal, and a clean pilot signal if the neural network parameter and the noisy pilot signal are received.

Each of the methods of the fourth to sixth aspects may be a method of channel estimation.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:

Training effort may be reduced;

NN parameter is quickly learned all over the network (or the considered part of the network);

Flexibility to leverage accuracy of channel estimation and computational effort.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIGS. 9(a) and 9(b) show universal spatial training and testing for SNR at 20 dB according to some example embodiments of the invention;

FIG. 11 shows universal frequency training and testing according to some example embodiments of the invention;

FIG. 12 shows an apparatus according to an embodiment of the invention;

FIG. 13 shows a method according to an embodiment of the invention;

FIG. 14 shows an apparatus according to an embodiment of the invention;

FIG. 15 shows a method according to an embodiment of the invention;

FIG. 16 shows an apparatus according to an embodiment of the invention;

FIG. 17 shows a method according to an embodiment of the invention;

FIG. 18 shows an apparatus according to an embodiment of the invention; and

DETAILED DESCRIPTION OF CERTAIN EMBODIMENTS

Figure 1:
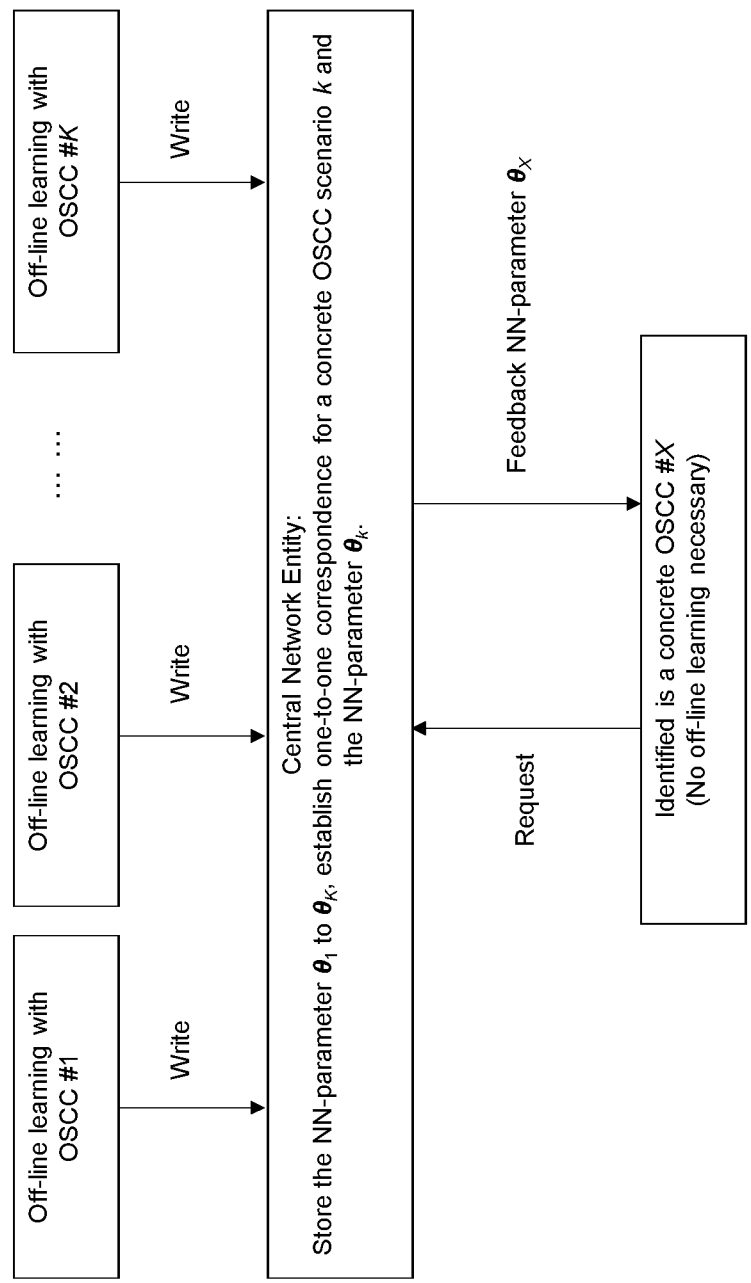
FIG. 1 shows a conceptual diagram according to some example embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of this invention provide an efficient channel estimation approach with the help of Neural Network (NN). It provides a trade-off between the performance and complexity.

A typical NN includes a network skeleton and weights. Machine learning is a procedure to find out the weights with the existing network skeleton to fulfill an objective function and, thus, reach certain performance.

Recently, NN based channel estimation solutions appeared, which can deliver similar performance as the conventional channel estimation solutions or can even conditionally outperform them with much lower computational complexity. In [2], NN-based channel estimation approach is proposed by off-line learning the MMSE channel estimation weighting vector for massive MIMO system. With ML, the computational expensive inversion of channel covariance matrix can be avoided. It is demonstrated in [2], that similar performance can be achieved with NN-based channel estimation, comparing to genie aided MMSE channel estimation, in which channel spatial covariance matrix and noise variance are assumed to be perfectly known.

As a further enhancement of [2], online training is introduced by [3] by exploiting reliably estimated data symbols as additional pilots, in order to fine-tune the NN parameter, and thus improve the channel estimation iteratively.

Reference [4] provides a proof-of-concept of the NN-based channel estimation, by means of real-time experiment and measurement.

Nevertheless, the NN-based channel estimation requires offline data pre-training followed by online fine tuning to achieve the best performance. These steps are required because the NN "learns" and adapts to a specific channel. In other words, the best performance of such systems will be achieved when the NN is permanently trained for a specific channel (a region, specific angular direction). This is a rather cumbersome problem to deal with in practice. Namely, user-specific training and parameter sets might be too costly in memory and computational effort. On the other hand, one single training- and parameter set might sacrifice channel estimation performance in terms of mean squared error.

According to some example embodiments of the invention, the trained NN is used for other scenarios with similar onsite channel characteristics. I.e., the noisy observation go through the existing NN network, being processed by the pre-calculated weights and being processed by the pre-calculated weights. The channel estimates then can be obtained at the output of the NN network.

Some example embodiments of the invention extend the approach from [3] (online training) by a central network entity. In the central network entity, On-Site Channel Characteristics (OSCC) are classified (sorted into different classes). For each of the classes, a class-specific NN-parameter (parameter set) is stored. The class-specific NN-parameter is obtained from training performed separately for each class. In the present application, the term "NN-parameter" may mean a single parameter or a parameter set.

This approach is illustrated in FIG. 1. On top, it is shown that the training is performed separately per OSCC class (classes 1 to K). For each of the classes, the NN-parameter obtained from these trainings are stored in the central network entity (middle). On the bottom, an actual receiver (e.g. BS or UE) is shown. The receiver identifies its OSCC. Then, the receiver provides an indication of the OSCC to the central network entity which determines the class from the indication of the OSCC, and/or the receiver determines the OSCC class and provides an indication of the OSCC class to the central network entity. Upon receipt of the indication (and determination of the OSCC class, if needed), the central network entity provides to the receiver the NN-parameter $\theta_k$ stored for the OSCC class. The receiver uses the NN-parameter as starting parameter in a neural network to estimate the actual channel.

In detail, the receiver uses the class-specific NN-parameter to estimate the unknown channel which, according to its OSCC, belongs to the class. I.e., the receiver uses an NN-based channel estimator with NN-parameter(s) obtained from the central network entity that have been particularly learned for that channel class. This procedure yields improved channel estimation performance.

Furthermore, due to the central network entity, the NN-training complexity may be lowered by performing a centralized/network wide (but channel class specific) NN-training instead of performing training for each channel. By doing so, the network obtains much faster a training data base of sufficient size, and each network element can utilize the NN-parameters from that central pool.

Some example embodiments of the invention enable UEs and/or BSs to apply NN-based channel estimation without the need for implementing any NN-training. To do so, the UE and/or BS may download the (centrally) learned NN-parameters from the central entity and directly apply those in NN-based channel estimation.

An OSCC class may be specified by a specific value range for one or more of the following characteristics: Direction of Arrival (DoA), angular spread, angular power spectrum, delay spread, Signal-to-Noise Ratio (SNR). This list is not exhaustive. Based on the specified characteristics, each channel may be classified into a respective OSCC class. The value(s) of these characteristic(s) (i.e. the OSCC characteristic(s)) can be easily derived from the raw channel estimates (which also form the input into the NN-based channel estimator). Channels with similar OSCC (i.e., within a given value range) form a unique class, for which a dedicated NN training is performed (yielding a dedicated NN-parameter (set)).

Hereinafter, some details of the implementation are described.

Figure 2:
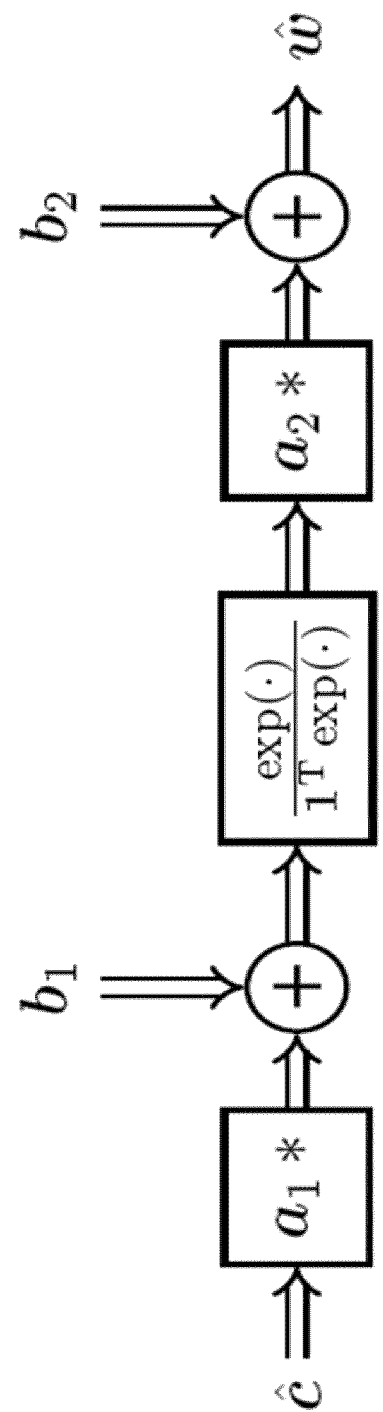
FIG. 2 shows a convolutional neural network which may be used in some example embodiments of the invention.

FIG. 2 depicts the ML-based channel estimation according to [2]. It has two layers and softmax activation. According to reference [2] the conventional MMSE channel estimator is equivalently represented in the structure of a Convolutional Neural Network (CNN) with two layers and softmax activation. The (input) variable ĉ denotes the (vectorized) scaled sample covariance matrix of the decorrelated received (uplink) pilot vectors $Y_r(t)$ from observation times t=1, 2, . . . , T; It holds, $$\hat{c}(t) = vec\left\{\frac{1}{\sigma^2}\sum_{t=1}^{T}Y_r(t)Y_r^H(t)\right\}. \quad (1)$$

Superscript H denotes a Hermitian. The output ŵ(t) of the neural network are the (vectorized) weights of the (MMSE) optimal channel estimator, which are used to compute the (MIMO) channel vector estimate Ĥ(t)=Ŵ(t)$Y_r$(t) at time t. The noise variance is denoted as $\sigma^2$.

Figure 3:
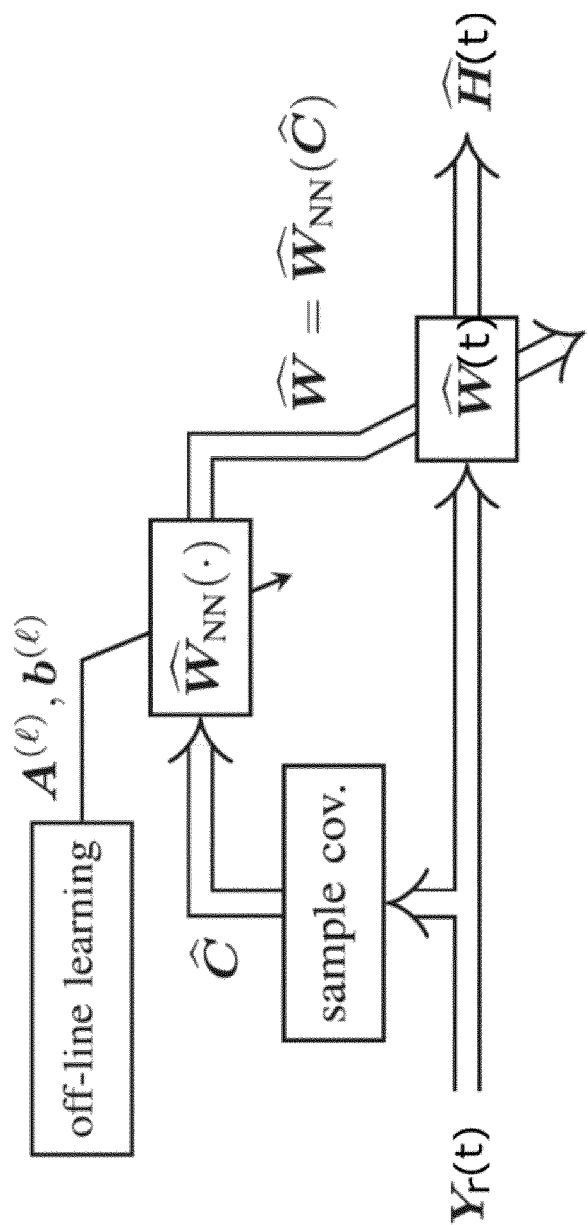
FIG. 3 shows a channel estimator with embedded neural network according to [2]

For a channel described by certain OSCC, the NN parameter $\theta=(a_1, b_1, a_2, b_2)$ is off-line trained by machine learning methods. Exploiting the spatial sample covariance matrix as training dataset, the NN parameter can be solved with a stochastic gradient method to find (local) optima for the variables. The obtained NN parameter can further generate the real-time channel estimates for the matched OSCC. The complete procedure is depicted in FIG. 3. The result is an estimator that works well in more general 3GPP propagation channel models, in which the globally optimal estimator would no longer be tractable.

FIGS. 2 and 3 and related text denote examples of a CNN and a channel estimator with embedded neural network. However, the invention is not limited to these examples. Other NNs (in particular: other CNNs) and/or other channel estimators with embedded neural network may be used according to some example embodiments of the invention.

Figure 19:
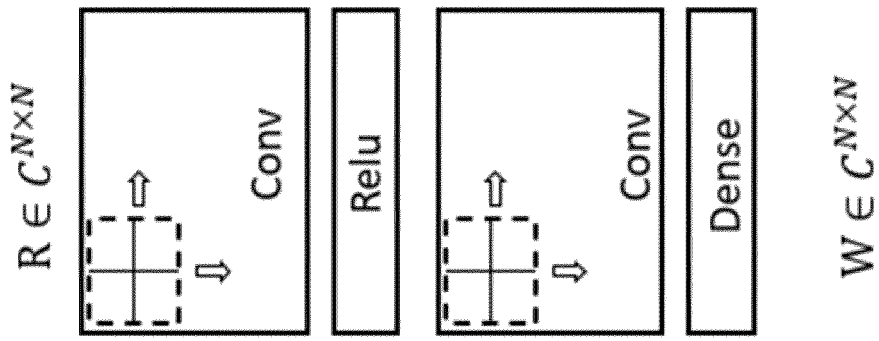
FIG. 19 shows a neural network which may be used in some example embodiments of the invention.

FIG. 19 shows an example of a functioning NN that can learn the channel to some extent. The figure depicts two convolutional layers each with a 2 by 2 layers filter. The two CNN's are connected by a non-linear layer of ReLU. Of course, the training should be performed with the same channel estimator embedding the same NN as the actual receiver uses to estimate the channel.

Figure 4:
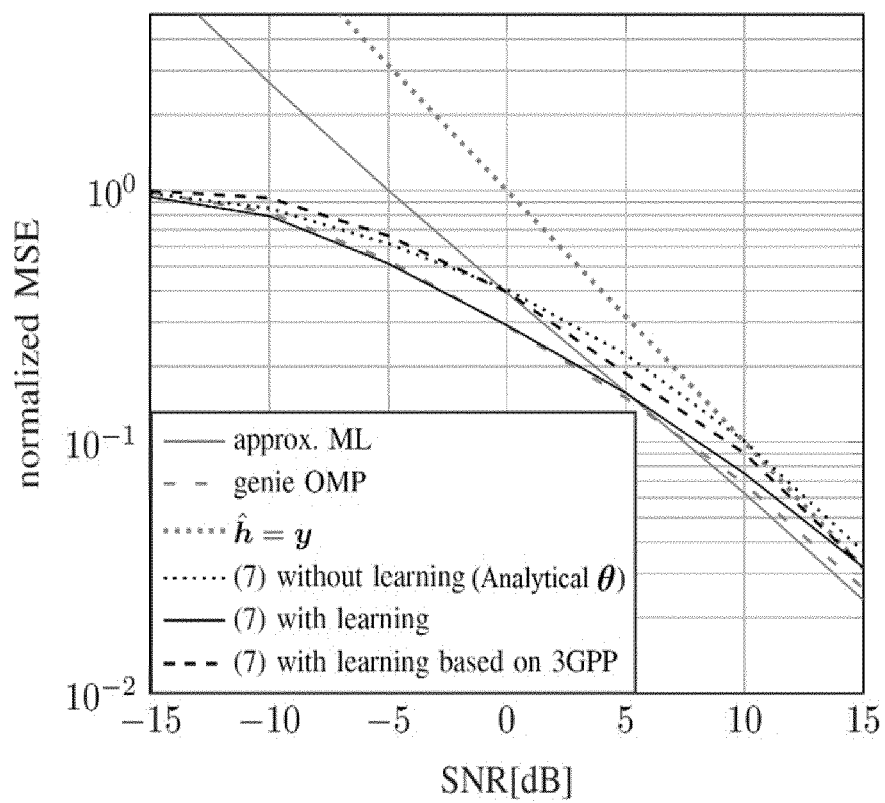
FIG. 4 shows NMSE vs. SNR with 16-antenna ULA, taken from [4]

When analyzing the on-site measurement results of [4], the inventors realized that the NN parameter for the channel estimation exhibit certain tolerance and strong dependency on OSCC. The "tolerance" means that NN-based channel estimator identifies the wireless environment in a "tolerant" way, e.g. same ML parameter can be valid for channels with Line-of-Sight (LoS) and Non-Line-of-Sight (NLoS) components, in which the channel covariance matrix can significantly change, from the view point of traditional channel estimation approaches. The measurements in [4] were conducted on the Nokia campus in Stuttgart. The area mostly consists of buildings (height of 15 meters) arranged along streets, acting as reflectors for the radio waves and partly blocking the direct LoS path towards the BS antenna array, yielding a mixture of LoS and NLoS measurement point. The antenna array was placed on the roof-top of one of these buildings). The geometry of the BS array has been adapted to the (urban micro) propagation scenario which exhibited a larger horizontal than vertical angular spread; that is, 4 rows with 16 (single-pol.) patch antennas each, a horizontal antenna spacing of $\lambda/2$, and a vertical separation of $\lambda$. FIG. 4 shows NMSE vs. SNR for the scenario. The performance difference of the NN with analytically derived NN-parameter (denoted as '(7) without learning'), learning based on synthetic 3GPP channel model data (denoted as '(7) with learning based on 3GPP'), and learning with on-site channel measurements (denoted as '(7) with learning') are not significantly large, even within a LoS and NLoS coexistence environment. This is an indicator for the NN's tolerance. Further curves shown in FIG. 4 are 'approx. ML': approximate maximum likelihood estimation of the channel covariance matrix, which exploits similar assumptions on the channels in order to obtain a reasonably low computational complexity, see [5]. Having estimated the channel covariance matrix C, the classical MMSE estimator W is computed as $W=C(C+\sigma^2 I)^{-1}$.

'genie OMP': The compressed sensing based method OMP (orthogonal matching pursuit). Due to the angular spread inside the clusters, however, the channels are only approximately sparse, and it is not clear how the sparsity level should be chosen in the OMP algorithm. The authors in [4] therefore performed an optimistic evaluation of the MSE performance of OPM by running the algorithms for various sparsity levels and choosing the solution that achieves the best MSE. As this choice can only be performed when the true channels are known, this method is referred to as genie aided OMP.

Figure 5:
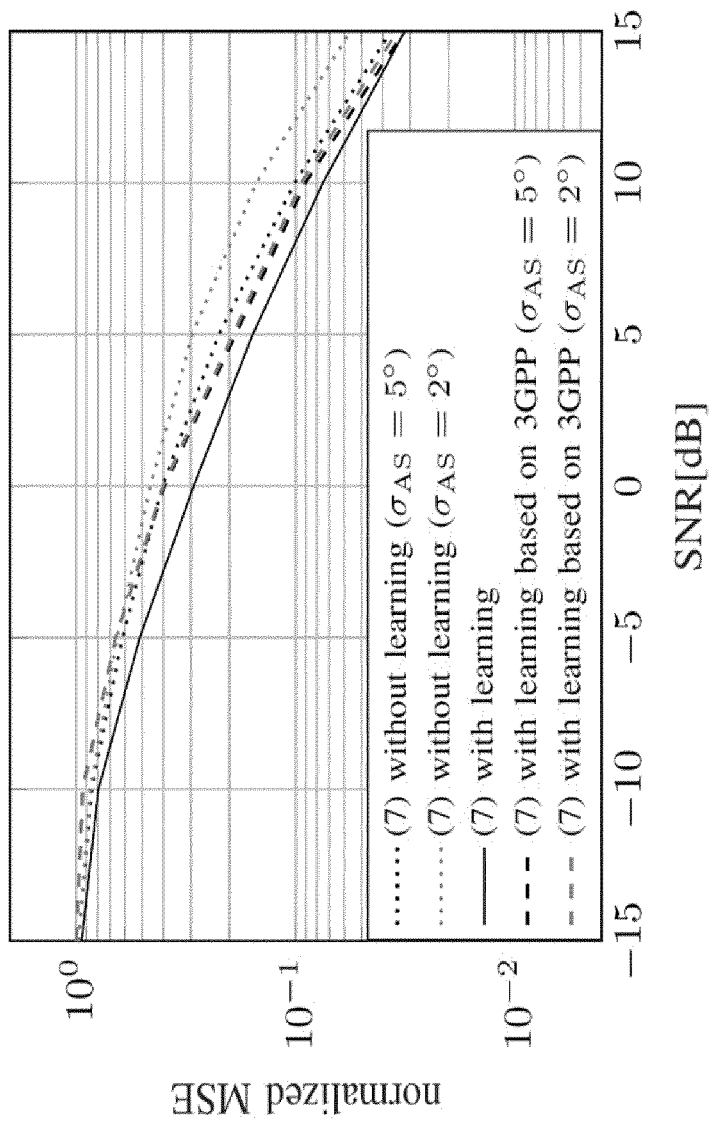
FIG. 5 corresponds to FIG. 4 but distinguishes two different angular spreads according to the theoretical model of [4]

On the other side, the inventors also realized that performance can still be enhanced, if the OSCC can be precisely identified. For instance, as shown in FIG. 5, the NN has been trained with synthetic 3GPP channel model data (denoted as '(7) with learning based on 3GPP ($\sigma_{AS}=5°$)' and '(7) with learning based on 3GPP ($\sigma_{AS}=2°$)') where the parameters $\sigma_{AS}$ refers to the angular spread of the angular power spectrum that was used to generate the synthetic training data. Note, Urban Micro channels (such as the measured Nokia campus) typically exhibit an angular spread of $\sigma_{AS}=5°$, while urban macro channels typically show $\sigma_{AS}=2°$. In FIG. 5, it is shown that the synthetic training data that is better matched to the measurement channel data provides better estimation performance, especially at low SNR region. Same holds for the case were the NN weights have been derived analytically (denoted as '(7) without learning ($\sigma_{AS}=5°$)' and '(7) without learning ($\sigma_{AS}=2°$)')

According to some example embodiments of the invention, the receiver (Base Station (BS) or a User Equipment (UE)), identifies the current value of the OSCC of the wireless environment (i.e. of the currently used channel) and requests the proper NN parameter $\theta=(a_1, b_1, a_2, b_2)$ from the central network entity based on the current value of the OSCC. Typically, the current value of the OSCC may be obtained by real-time measurement. The receiver may include into the request the value of the OSCC and/or an indication of the OSCC class to which the value belongs. If the request comprises only the value, the central network entity may derive the OSCC class therefrom.

The NN parameters stored in the central network entity may be obtained by off-line training for each individual OSCC class. For example, the central network entity may be deployed in the cloud.

The OSCC may include one or more of the following information:
Carrier frequency
Height of receiver
Antenna configuration at receiver, e.g. Uniform Linear Array (ULA) or Uniform Rectangular Array (URA)
Angular spread at receiver
Number of clusters of objects (building etc.), which can cause the scattering effect during the radio propagation, and DoAs
Operational Signal-to-Interference-Noise-Ratio (SINR), i.e. the SINR value the receiver is typically working under.
GPS information of the sender of the receive channel (in particular if sender=UE, receiver=BS)
Location (in particular: height) of sender (UE)
Speed of sender (UE)
LoS component available
This list is not exhaustive.

Figure 6:
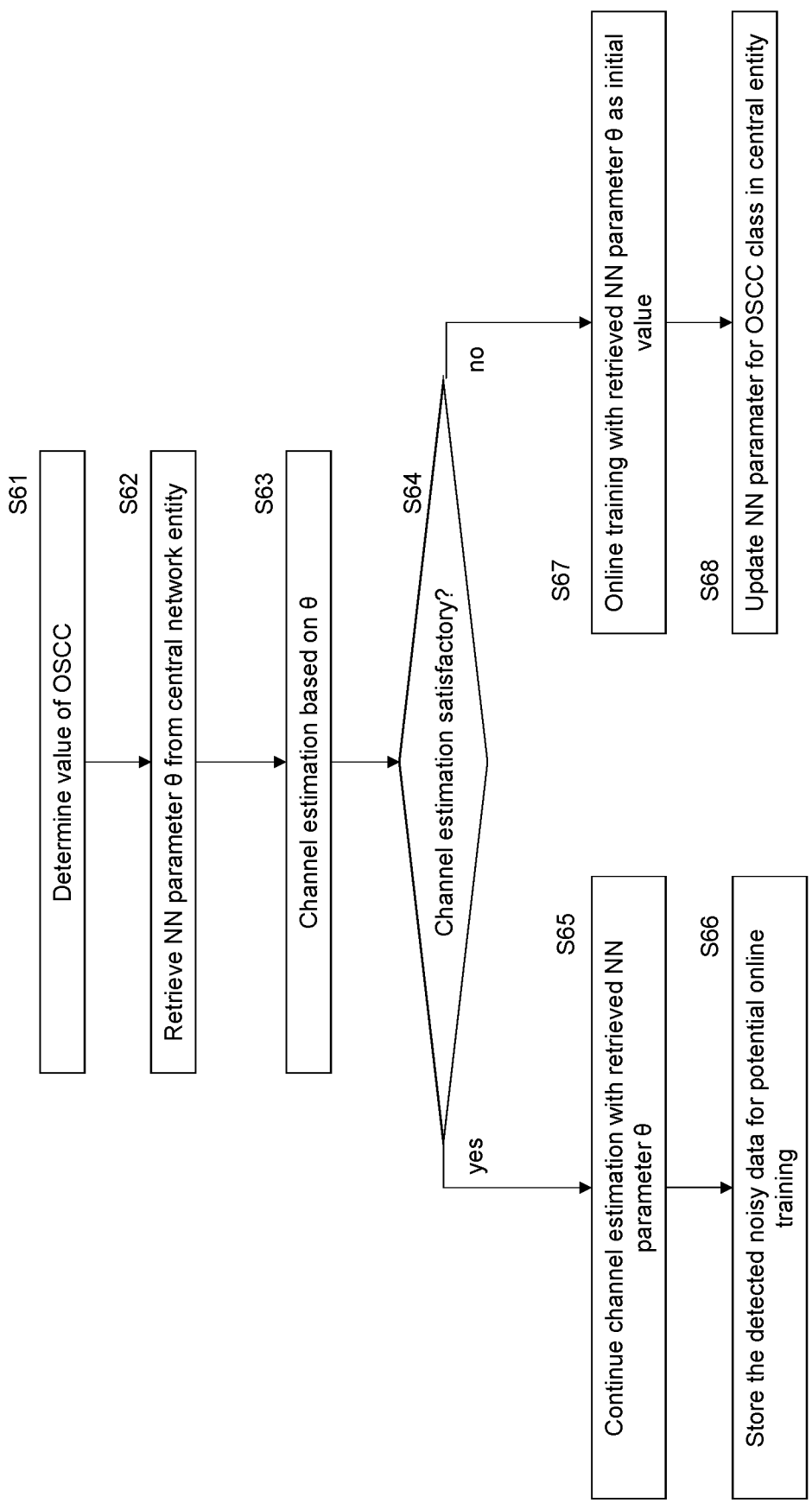
FIG. 6 shows a method according to some example embodiments of the invention.

FIG. 6 shows a method according to some example embodiments of the invention. This method is an extension of the concept shown in FIG. 1. Namely, in S61, the receiver determines the value of the OSCC of the receive channel. In S62, the receiver retrieves a NN parameter $\theta$ from the central network entity based on the value of the OSCC. In S63, the receiver estimates the channel using a neural network and the retrieved NN parameter $\theta$. This part of the method corresponds to the above discussed method.

In S64, the receiver checks if the channel estimation is satisfactory. For example, it may determine the MCS needed by the UE with the channel estimation based on the retrieved NN parameter $\theta$ for the determined value of the OSCC, in order to achieve a predefined BLER (e.g. 10% BLER). Depending on the determined MCS, the channel estimation may be considered as satisfactory or not. If the channel estimation is satisfactory (S64=yes), the receiver continues channel estimation on the basis of the retrieved NN parameter $\theta$. Thus, a low latency is achieved. Furthermore, it may store the detected noisy data for potential online training in a buffer. Namely, since the channel estimation is assumed to be satisfactory, the noisy data may be considered as reliably detected. The buffer may be a rolling buffer.

On the other hand, if the channel estimation based on the retrieved NN parameter θ is not satisfactory (S64=no), the receiver may perform online training, e.g. as described in [3]. For the online training, the receiver may use the noisy data stored in the buffer in S66. As an initial value of the NN parameter, it may use the retrieved NN parameter θ. Thus, the iterative online training may be accelerated and computational effort may be reduced. If the online training is finished (i.e., if it obtains a new NN parameter such that the channel estimation is satisfactory), the receiver may update the NN parameter in the central network entity for the OSCC class.

In some example embodiments, the central entity may consider such an update request from a particular receiver as a proposal. It may actually update the NN parameter for the OSCC class only if several corresponding requests are received from plural receivers.

Figure 7:
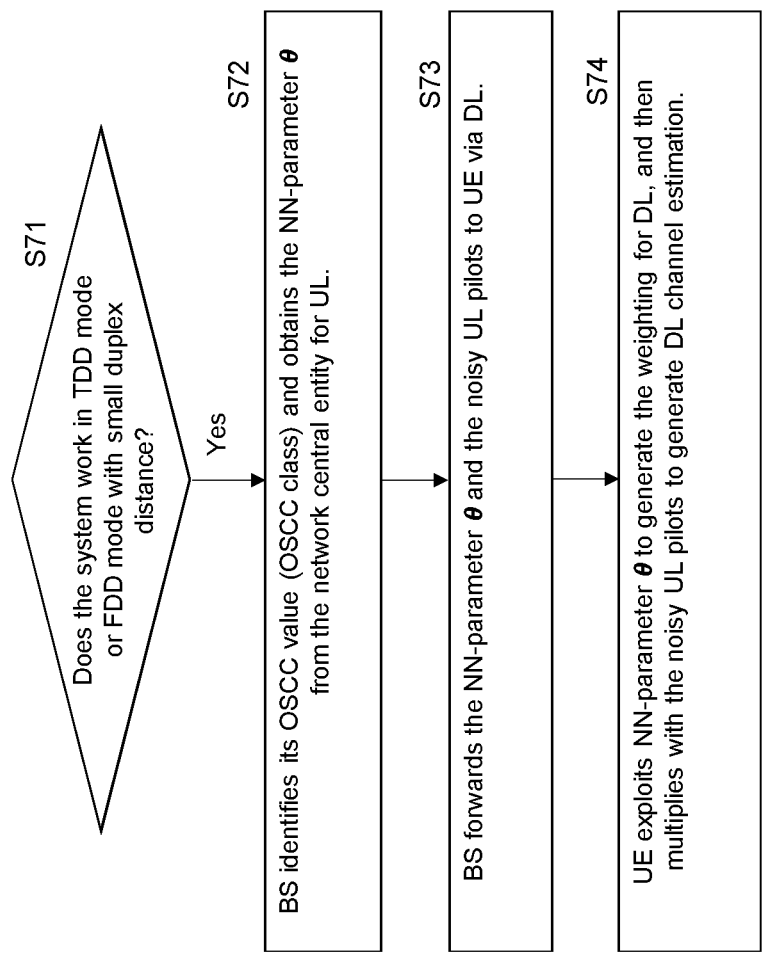
FIG. 7 shows a method according to some example embodiments of the invention.

Some example embodiments of the invention further reduce complexity at the UE side for downlink channel estimation which is most relevant for the UE, as shown in FIG. 7. In calibrated Time Division Duplex (TDD) systems there is reciprocity between Uplink (UL) and Downlink (DL) channels, in Frequency Division Duplex (FDD) systems with typical (i.e. sufficiently small) frequency duplexing distances there is at least statistical reciprocity if the antenna configurations for UL and DL are the same. Even if the UE has different antenna configurations in Tx (UL) and Rx (DL) direction (e.g., 1 or 2 Tx antennas, 4 or more Rx antennas), UL and DL channels may be sufficiently reciprocal to employ some example embodiments of the invention, at least if the UE does not utilizes Tx antenna virtualization (i.e., Tx beamforming). In these cases, classification of OSCC channels and a potential online training may happen using only UL channel estimates from the BS because single channel realizations do not matter for that purpose but only statistical properties from the scattering environment. If the NN parameters are determined and stored by the central network entity, the UE downloads the NN-parameter with respect to its OSCC class via the BS in the downlink and applies it for its ML channel estimation. Thus, the burden of training at the UE is avoided. In addition, the need for signaling the CSI via the uplink to the BS may be avoided.

In some example embodiments, the UE may also estimate the UL channel if the UL and DL channels are sufficiently reciprocal. Namely, BS may forward a noisy pilot (received from the UE) to the UE, so that the UE can estimate the UL channel with the known NN-parameter of a given OSCC. Thus, UL MIMO without gNB PMI feedback is becoming possible.

FIG. 7 shows a corresponding method for UL estimation. In S71, it is determined if the precondition (e.g. TDD or FDD with small duplex distance) is fulfilled. If yes, BS identifies the OSCC value (or the OSCC class) and obtains the NN parameter for this OSCC class from the central network entity (S72). BS forwards the NN parameter together with the received noisy UL pilots to UE (S73). In S74, UE uses the NN parameter to generate the weighting for DL, and then multiplies with the noisy UL pilots to generate UL channel estimation. In case of DL estimation, in S73, BS forwards only the NN parameter. In addition, BS sends DL pilot signals which are known to UE (predetermined). These DL pilot signals arrive as noisy DL pilot signals at the UE. Accordingly, in S74, UE uses the noisy DL pilot signals instead of the noisy UL pilot signals.

In some embodiments of the invention, BS estimates the UL channel based on the noisy pilot (received from UE), the clean pilot, and the NN-parameter for the given OSCC. BS configures UE with the clean pilot and, hence, the clean pilot is known to BS. Then, BS forwards the UL channel estimates to UE such that an UL channel estimation at UE is not needed.

In some example embodiments, both BS and UE determine if the receive channel and the transmit channel are substantially reciprocal. In some example embodiments, only the BS determines reciprocity. If the UE receives the NN parameter it understands that BS determined the channels to be substantially reciprocal.

The method of FIG. 7 may be applied between BS and UE, as described here. However, in general, it may be applied between any sender and receiver where the receive channel and the transmit channel are (substantially) reciprocal.

Figure 8:
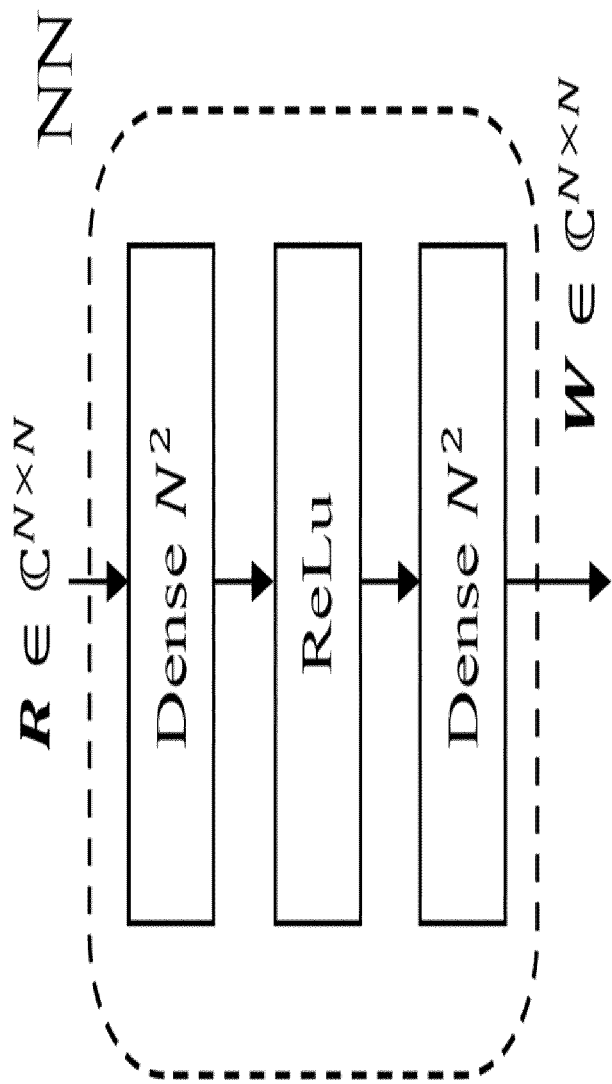
FIG. 8 shows a NN for channel estimation with sample covariance matrix.

For the training of the NN, in order to obtain the NN-parameters to be stored in the central network entity, a NN is established, which can provide the N×N weight matrix W, based on a learning procedure with the available training dataset of the N×N sample covariance matrix R. An example is shown in FIG. 8. In this figure, an implementation of MMSE on a NN is depicted as in [2]. There are two dense layers and one nonlinear layer or Rectified Linear Unit (ReLU).

In following discussion, the concept of Universal Training for a given OSCC class is explained.

(1) Universal Training in Space

Considering a Uniform Linear Array (ULA) with N=16 elements as an example receive antenna. As illustrated in FIG. 9(a), the training data is not collected for a dedicated spatial direction but for a range of spatial directions (DoAs). This range of spatial directions corresponds to an OSCC class. Thus, it is denoted as Universal Spatial Training. In contrast, the conventional training for a dedicated DoA, is referred to as Dedicated Spatial Training. Here, the training data batches (each corresponding to a user-specific DoA) are randomly selected from the cell range from −60° to +60°. It is important to introduce the randomization to shuffle the training data batches spatially, so that the Universal Spatial Training will not be stuck at a local optimum for a dedicated DoA. I.e., the training is performed on a batch of training data covering a range of DoAs, and the DoAs are randomly distributed in the batch of training data.

The Universal Spatial Training requires usually longer time than Dedicated Spatial Training to reach convergence. On the other side, once the Universal Spatial Training goes through, the model can be used by all the users in the cell, independent from the DoA the users are as long as it is in the considered range of DoAs. To validate this, e.g. for SNR at 20 dB, testing data are generated for different DoAs. The testing data of a given user from one dedicated DoA is represented by a triangle in FIG. 9(b).

By repeating to test these data of different users from −60° to +60° individually, the Normalized Mean Square Error (NMSE) of channel estimation is obtained and plotted in FIG. 9(b), by simply using the model from Universal Spatial Training. Additionally, the benchmark performance with Dedicated Spatial Training is also presented. In general, the dedicated model turns out to be a better solution. Nevertheless, the outperforming on an average of 1.5 dB is also limited. In return, the universal model provides a solution for a practical system with offline training.

(2) Universal Training for Different OSCC Classes

Figure 10:
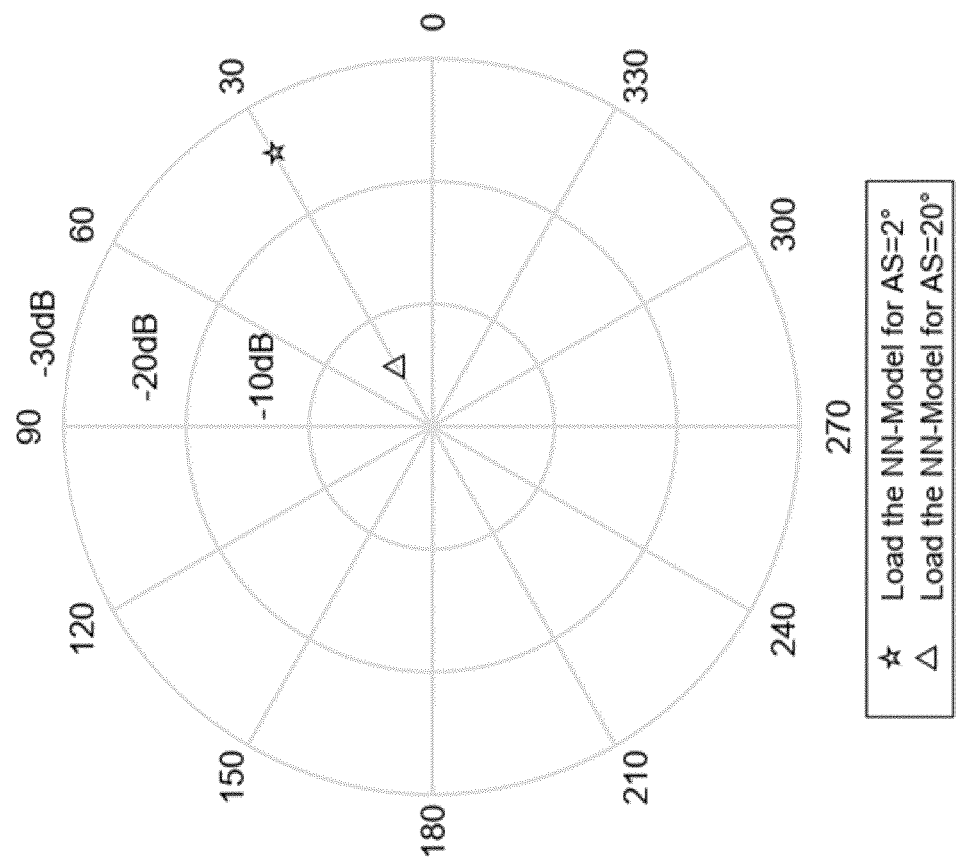
FIG. 10 shows a performance difference (channel estimation NMSE in dB) with mismatched NN-model under a given OS CC, SNR 20 dB

In FIG. 10, another example is presented to exhibit the necessity to introduce a respective separate universal training for different OSCC classes. In this example, two NN-models are available by means of universal spatial training. One NN-model is obtained for OSCC1 with 2° angular spread, and the other for OSCC2 with 20° angular spread. In this example, the testing data is generated for OSCC1, with respect to 2° angular spread. Deploying the matched NN-model, the NMSE of channel estimation is about −25.74 dB, which coincides with the results in FIG. 9(b). Nevertheless, if the mismatched NN-model is exploited, e.g. the NN-model of OSCC2 regarding to the angular spread 20°, the NMSE of the channel estimation is about −5.6705 dB. The degradation is obvious.

Depending on the deployment of the cell
(a) Antenna below rooftop in dense urban or
(b) Antenna above rooftop,
we have already a coarse estimate on the present angular spread of the environment, for (a) it's low, for (b) it's high With this basic information e.g. provided by O&M we selected the appropriate OSCC class; in our example this would be OSCC1 for (b) and OSCC2 for (a) and then carry the feedforward application of the NN for either OSCC1 or OSCC2. If we do online-training in addition, we will do this OSCC-specific as well.

(3) Universal Training in Frequency

In FIG. 11, two experiments are shown to exhibit that Universal Training is also applicable in Frequency. We consider a SISO system in a multicarrier system. In the first experiment, we have the clean channel label over 32 sub-carriers and 9991 symbols, generated by the 3GPP compliant channel model. The "clean channel label" is the perfect channel. Here we generate the clean channel label via 3GPP channel model. In ML-based channel estimation, the observation (noisy receive signal) and the clean channel label are used to find out the NN weights. In the experiments, we exploit the NN-model for the practical application in wireless system.

Then, we add on additive white Gaussian noise to pose a target SNR at 10 dB. With this, we obtain the noisy observation, which can be regarded as the receive signal from a practical system, and thus can generate the 32×32 sample covariance matrices as the whole training dataset. After the learning procedure, we store the model of this experiment.

In the next experiment (referred to as Experiment 6), we assume there is another user, who has the same OSCC as the user in previous experiment. Namely, the channel of the other user is generated with the same 3GPP channel model parameters, except that the other user is allocated to another frequency band. We use the previously stored model to carry out the testing and estimate the channel of the other user. The numerical result shows that the model can be universally used by the other user and deliver solid performance as well.

The experiments discussed hereinabove introduce some simplification or abstraction for the channel modelling, comparing to the scenarios in the practical system. Nevertheless, these experiments give a very clear indication. The receiver (e.g. BS such as Node B (gNB)) may store the universal models and use the models to perform the channel estimation for an arbitrary sender (e.g. user, UE) for a given OSCC, if the OSCC can be recognized by the system. The OSCC oriented offline universal training can save huge computational effort for a wireless system.

FIG. 12 shows an apparatus according to an embodiment of the invention. The apparatus may be a receiver, such as a BS or a UE, or an element thereof. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for identifying 10, means for requesting 20, means for monitoring 30, and means for estimating 40. The means for identifying 10, means for requesting 20, means for monitoring 30, and means for estimating 40 may be an identifying means, requesting means, monitoring means, and estimating means, respectively. The means for identifying 10, means for requesting 20, means for monitoring 30, and means for estimating 40 may be an identifier, requestor, monitor, and an estimator, respectively. The means for identifying 10, means for requesting 20, means for monitoring 30, and means for estimating 40 may be an identifying processor, requesting processor, monitoring processor, and estimating processor, respectively.

The means for identifying 10 identifies a value of an onsite channel characteristic of a receive channel (S10). The means for requesting 20 requests a neural network parameter (S20). The request from the means for requesting 20 comprises an indication of the onsite channel characteristic. For example, it may comprise the value or an indication of a class to which the value belongs.

The means for monitoring 30 monitors if the neural network parameter is received in response to the request (S30). If the neural network parameter is received (S30=yes), the means for estimating 40 estimates the receive channel by a neural network using the received neural network parameter (S40).

FIG. 14 shows an apparatus according to an embodiment of the invention. The apparatus may be a central network entity, such as a repository of NN-parameters, or an element thereof. FIG. 15 shows a method according to an embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for monitoring 110, means for selecting 120, and means for providing 130. The means for monitoring 110, means for selecting 120, and means for providing 130 may be a monitoring means, selecting means, and providing means, respectively. The means for monitoring 110, means for selecting 120, and means for providing 130 may be a monitor, selector, and a provider, respectively. The means for monitoring 110, means for selecting 120, and means for providing 130 may be a monitoring processor, selecting processor, and providing processor, respectively.

The means for monitoring 110 monitors if a request for a neural network parameter is received (S110). The request comprises an indication of an onsite channel characteristic. If the request is received (S110=yes), the means for selecting selects the neural network parameter based on the onsite channel characteristic (S110). The means for providing 130 provides the selected neural network parameter in response to the request (S130).

FIG. 16 shows an apparatus according to an embodiment of the invention. The apparatus may be a sender and receiver, such as a UE, or an element thereof. FIG. 17 shows a method according to an embodiment of the invention. The apparatus according to FIG. 16 may perform the method of FIG. 17 but is not limited to this method. The method of FIG. 17 may be performed by the apparatus of FIG. 16 but is not limited to being performed by this apparatus.

The apparatus comprises means for monitoring 210 and means for estimating 220. The means for monitoring 210 and means for estimating 220 may be a monitoring means and estimating means, respectively. The means for monitoring 210 and means for estimating 220 may be a monitor and estimator, respectively. The means for monitoring 210 and means for estimating 220 may be a monitoring processor and estimating processor, respectively.

The means for monitoring 210 monitors if a neural network parameter and a noisy pilot signal are received on a receive channel (S210). The noisy pilot signal may be the signal received by a receiver after a clean pilot signal (a clean pilot UL signal, if the apparatus is (a part of) a UE) was sent. The noisy pilot signal may be a received pilot signal, wherein the clean pilot signal (a clean pilot DL signal, if the apparatus is (a part of) a UE) on which the received pilot signal is based is known (predetermined).

If the neural network parameter and the noisy pilot signal are received (S210=yes), the means for estimating 220 estimates the receive channel from the receiver by a neural network using the neural network parameter, the noisy pilot signal, and a clean pilot signal.

FIG. 18 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 13, 15, and 17 and related description.

Each NN parameter may comprise one or plural values such as θ=(a$_1$, b$_1$, a$_2$, b$_2$). I.e., each of the NN parameters comprising plural values may be considered as a vector.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

A base station may be a gNB, eNB, etc. A terminal (UE) may be e.g. a mobile phone, a smart phone, a MTC device, a laptop etc. The central entity may be deployed stand-alone, or jointly with another entity such as an of plural base stations (gNBs) of a networks. The central entity may be related to one or more base stations of a network. For example, it may be related to all the base stations of the network or of a region of the network, or to one or more base stations of a certain vendor.

The invention is not limited to a 5G network. It may be employed in other networks where a channel is estimated such as 3G networks, 4G networks, but also non-3GPP wireless networks like WiFi.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities may be embodied in the cloud.

According to the above description, it should thus be apparent that example embodiments of the present invention provide, for example, a receiver such as a base station (e.g. gNB or eNB) or a UE, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a central entity such as a repository, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code,
wherein the at least one memory and the computer program code are configured, with the at least one processor, to cause the apparatus to:
identify a value of an onsite channel characteristic of a receive channel;
request a neural network parameter, wherein the request comprises an indication of the onsite channel characteristic;
monitor if the neural network parameter is received in response to the request; and
estimate the receive channel by a neural network using the neural network parameter if the neural network parameter is received.

2. The apparatus according to claim 1, wherein the at least one memory and the computer program code are further configured, with the at least one processor, to cause the apparatus to:
determine a class based on the value of the onsite channel characteristic; wherein
the indication of the onsite channel characteristic comprises an indication of the class.

3. The apparatus according to claim 1, wherein
the indication of the onsite channel characteristic indicates the value of the onsite channel characteristic.

4. The apparatus according to claim 1, wherein the at least one memory and the computer program code are further configured, with the at least one processor, to cause the apparatus to:
check if an estimation of the receive channel based on the received neural network parameter is satisfactory; and perform an online training to determine a new neural network parameter for estimating the receive channel if the estimation is not satisfactory.

5. The apparatus according to claim 4, wherein the at least one memory and the computer program code are further configured, with the at least one processor, to cause the apparatus to:
buffer noisy data received on the receive channel if the estimation is satisfactory; and
perform the online training on the buffered noisy data.

6. The apparatus according to claim 4, wherein the at least one memory and the computer program code are further configured, with the at least one processor, to cause the apparatus to:
update a central network entity by the new neural network parameter, wherein
to request the neural network parameter from the central network entity.

7. The apparatus according to claim 1, wherein the at least one memory and the computer program code are further configured, with the at least one processor, to cause the apparatus to:
decide if the receive channel from a sender is reciprocal or substantially reciprocal to a transmit channel to the sender; and
forward the retrieved neural network parameter and a pilot signal received from the sender on the receive channel to the sender on the transmit channel if the receive channel is reciprocal or substantially reciprocal to the transmit channel.

8. The apparatus according to claim 1, wherein the at least one memory and the computer program code are further configured, with the at least one processor, to cause the apparatus to:
decide if the receive channel from a sender is reciprocal or substantially reciprocal to a transmit channel to the sender;
supervise if a noisy pilot signal is received on the receive channel from the sender;
estimate the receive channel from the sender by a neural network using the neural network parameter, the noisy pilot signal, and a predetermined clean pilot signal if the noisy pilot signal is received; and
provide the channel estimation to the sender.

9. The apparatus according to claim 1, wherein the onsite channel characteristic is at least one of a carrier frequency band of the receive channel, an angular spread of the receive channel, a configuration of an antenna, a direction of arrival of the receive channel, a height of the antenna, a location of a sender on the receive channel, a speed of the sender, a line-of-sight indication indicating if the sender is on a line-of-sight from the antenna, an angular power spectrum of the receive channel, a delay spread on the receive channel, and an operational signal to interference+noise ratio of the receive channel.

10. The apparatus according to claim 1, wherein the neural network parameter is used as a starting value in the estimating.

11. An apparatus, comprising:
at least one processor; and
at least one memory including computer program code, wherein the at least one memory and the computer program code are configured, with the at least one processor, to cause the apparatus to:
monitor if a request for a neural network parameter is received, wherein the request comprises an indication of an onsite channel characteristic;
select the neural network parameter based on the onsite channel characteristic if the request is received; and
provide the neural network parameter in response to the request.

12. The apparatus according to claim 11, wherein the at least one memory and the computer program code are further configured, with the at least one processor, to cause the apparatus to:
select the neural network parameter among a plurality of stored neural network parameters; wherein
each of the stored neural network parameters is related to a respective class of onsite channel characteristics; and
the at least one memory and the computer program code are further configured, with the at least one processor, to cause the apparatus to:
select the neural network parameter such that the onsite channel characteristic matches the class to which the neural network parameter is related.

13. The apparatus according to claim 12, wherein the indication of the onsite channel characteristic comprises an indication of the class.

14. The apparatus according to claim 12, wherein
the indication of the onsite channel characteristic indicates a value of the onsite channel characteristic, and
the at least one memory and the computer program code are further configured, with the at least one processor, to cause the apparatus to:
determine the class based on the value of the onsite channel characteristic.

15. The apparatus according to claim 11, wherein the at least one memory and the computer program code are further configured, with the at least one processor, to cause the apparatus to:
supervise if a request to update the neural network parameter is received from a receiver;
update the neural network parameter if the request to update is received; and
monitor if the request for the neural network parameter is received from the receiver.

16. The apparatus according to claim 12, wherein the at least one memory and the computer program code are further configured, with the at least one processor, to cause the apparatus to:
train a neural network to obtain one of the neural network parameter based on a batch of training data, the batch of training data covers a range of different values of the onsite channel characteristics corresponding to the class, and the training data in the batch are randomly sorted according to the respective value of the onsite channel characteristic.

17. The apparatus according to claim 11, wherein the onsite channel characteristic is at least one of a carrier frequency band of a receive channel, an angular spread of the receive channel, a configuration of the antenna, a direction of arrival of the receive channel, a height of the antenna, a location of a sender on the receive channel, a speed of the sender, a line-of-sight indication indicating if the sender is on a line-of-sight from the antenna, an angular power spectrum of the receive channel, a delay spread on the receive channel, and an operational signal to interference+noise ratio of the receive channel.

18. An apparatus, comprising:
at least one processor; and
at least one memory including computer program code, wherein the at least one memory and the computer program code are configured, with the at least one processor, to cause the apparatus to:

monitor if a neural network parameter and a noisy pilot signal are received on a receive channel;

estimate the receive channel from the receiver by a neural network using the neural network parameter, the noisy pilot signal, and a clean pilot signal if the neural network parameter and the noisy pilot signal are received.

19. The apparatus according to claim 18, wherein the at least one memory and the computer program code are further configured, with the at least one processor, to cause the apparatus to:

instruct sending the clean pilot signal to a receiver; and monitor if the noisy pilot channel is received on the receive channel from the receiver.

20. The apparatus according to claim 19, wherein the at least one memory and the computer program code are further configured, with the at least one processor, to cause the apparatus to:

inhibit sending a channel state information of the receive channel to the receiver if the neural network parameter and the noisy pilot signal are received.

\* \* \* \* \*